US012772170B2

(12) United States Patent
Wang et al.

(10) Patent No.: US 12,772,170 B2
(45) Date of Patent: Oct. 20, 2026

(54) PERFORMING PRIMARY CELL SLEEP BEHAVIOR

(71) Applicant: DATANG MOBILE COMMUNICATIONS EQUIPMENT CO., LTD., Beijing (CN)

(72) Inventors: Jiaqing Wang, Beijing (CN); Fangchen Cheng, Beijing (CN); Chen Luo, Beijing (CN); Meiying Yang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 331 days.

(21) Appl. No.: 18/005,666

(22) PCT Filed: Jun. 23, 2021

(86) PCT No.: PCT/CN2021/101794
§ 371 (c)(1),
(2) Date: Jan. 16, 2023

(87) PCT Pub. No.: WO2022/012286
PCT Pub. Date: Jan. 20, 2022

(65) Prior Publication Data

US 2023/0232330 A1 Jul. 20, 2023

(30) Foreign Application Priority Data

Jul. 17, 2020 (CN) ........................ 202010694102.3

(51) Int. Cl.
*H04W 52/02* (2009.01)

(52) U.S. Cl.
CPC ............................... *H04W 52/0235* (2013.01)

(58) Field of Classification Search
CPC ......... H04W 52/0235; H04W 52/0229; H04W 52/028; H04W 76/28; H04W 76/15;
(Continued)

(56) References Cited

U.S. PATENT DOCUMENTS

2013/0163497 A1 6/2013 Wei
2014/0050113 A1 2/2014 Rosa
(Continued)

FOREIGN PATENT DOCUMENTS

CN 102448151 A 5/2012
CN 103503535 A 1/2014
(Continued)

OTHER PUBLICATIONS

Power Saving in NR-U, Hua Zhou, Oct. 2, 2019, paragraphs 308 (Year: 2019).*
(Continued)

*Primary Examiner* — Ian N Moore
*Assistant Examiner* — Latresa A McCallum
(74) *Attorney, Agent, or Firm* — Ladas & Parry, LLP

(57) ABSTRACT

A sleep indication method includes: receiving, by a UE, first information, the first information being used to indicate to perform a PCell sleep behavior; and performing, by the UE, the PCell sleep behavior for a PCell in accordance with the first information.

15 Claims, 5 Drawing Sheets

(58) Field of Classification Search
CPC ..... H04L 1/1848; H04L 1/1896; H04L 5/001; H04L 5/0023; H04L 5/0032; H04L 5/0098; H04L 1/0026; H04L 1/1819; H04L 1/1822; Y02D 30/70
See application file for complete search history.

(56) References Cited

U.S. PATENT DOCUMENTS

| | | | | |
|---|---|---|---|---|
| 2018/0323940 | A1* | 11/2018 | Rico Alvarino | H04L 5/0057 |
| 2020/0037389 | A1* | 1/2020 | Feuersaenger | H04W 52/0216 |
| 2020/0145164 | A1 | 5/2020 | Cheng | |
| 2021/0051698 | A1* | 2/2021 | Tsai | H04W 72/23 |
| 2022/0256462 | A1* | 8/2022 | Li | H04W 76/15 |
| 2022/0279557 | A1* | 9/2022 | Li | H04W 72/20 |
| 2022/0361024 | A1* | 11/2022 | Xue | H04W 72/23 |

FOREIGN PATENT DOCUMENTS

| | | | | |
|---|---|---|---|---|
| CN | 110881208 | A | 3/2020 | |
| CN | 111277399 | A | 6/2020 | |
| WO | 2012067333 | A1 | 5/2012 | |
| WO | 2020068253 | A2 | 4/2020 | |
| WO | WO-2021067703 | A1 * | 4/2021 | H04W 72/1273 |
| WO | WO-2021255712 | A1 * | 12/2021 | H04L 5/0053 |

OTHER PUBLICATIONS

Hyejung Jung, Power Efficient PDCCH Monitoring, Jun. 19, 2020, paragraph 11 (Year: 2020).*

Partial Supplementary European Search Report for European Patent Application No. 21843167.4 issued by the European Patent Office on Apr. 30, 2024.

"Discussion on PDCCH-based power saving signal/channel design," 3GPP TSG RAN WG1 #97, R1-1906524, Reno, USA, May 2, 2019, Source: CMCC, Agenda Item: 7.2.9.1.

International Search Report for PCT/CN2021/101794 issued on Sep. 1, 2021 and its English Translation provided by WIPO.

Written Opinion for PCT/CN2021/101794 issued on Sep. 1, 2021 and its English Translation provided by WIPO.

International Report on Patentibily for PCT/CN2021/101794 issued on Jan. 17, 2023 and its English translation provided by WIPO.

"Discussion on PDCCH-based power saving channel," 3GPP TSG RAN WG1 Meeting #98bis, R1-1910013, Chongqing, China, Oct. 14-20, 2019, Agenda Item: 7.2.9.1, Source: Spreadtrum Communications, all pages.

"Remaining issues for SCell dormancy," 3GPP TSG-RAN WG1 #100-e, R1-2000982, Feb. 24-Mar. 6, 2020, Agenda Item: 7.2.10.3, Source: Qualcomm Incorporated, all pages.

"PDCCH monitoring adaptation," 3GPP TSG RAN WG1 #102-e, R1-2005721, e-Meeting, Aug. 17-28, 2020, Source: CATT, Agenda Item: 8.7.2, all pages.

"PDCCH monitoring adaptation," 3GPP TSG RAN WG1 #103-e, R1-2007870, e-Meeting, Oct. 26-Nov. 13, 2020, Source: CATT, Agenda Item: 8.7.2, all pages.

First Office Action and search report for the corresponding Chinese Patent Application No. 202010694102.3 issued by the Chinese Patent Office on Jan. 5, 2023, and its English translation provided by the foreign associate.

"Introduction of dormancy behavior in Nr" 3GPP TSG-RAN WG2 Meeting #107bis R2-1913942, ChonQing, China, Oct. 14-18, 2019, Agenda Item: 6.10.4.2, Source: OPPO.

"Remaining issues on SCell dormancy like behavior" 3GPP TSG RAN WG1 Meeting #100bis, R2-2001689, e-Meeting, Apr. 20-Apr. 30, 2020, Source:vivo, Agenda Item: 7.2.10.3.

* cited by examiner

PERFORMING PRIMARY CELL SLEEP BEHAVIOR

CROSS-REFERENCE TO RELATED APPLICATIONS

This application is the U.S. national phase of PCT Application No. PCT/CN2021/101794 filed on Jun. 23, 2021, which claims a priority to the Chinese patent application No. 202010694102.3 filed on Jul. 17, 2020, the disclosures of which are incorporated herein by reference in their entireties.

TECHNICAL FIELD

The present disclosure relates to the field of communication technology, in particular to a sleep indication method, a User Equipment (UE), a network side device, and a storage medium.

BACKGROUND

In some communication systems (e.g., a $5^{th}$-Generation (5G) system), in order to further reduce power consumption of a UE, a sleep behavior is introduced. However, in the related art, the sleep behavior of the UE in these communication systems is a sleep behavior merely for a Secondary Cell (SCell), i.e., an SCell sleep behavior, so the power consumption of the UE is still relatively large.

SUMMARY

An object of the present disclosure is to provide a sleep indication method, a UE, a network side device and a storage medium, so as to reduce the power consumption of the UE.

In one aspect, the present disclosure provides in some embodiments a sleep indication method, including: receiving, by a UE, first information, the first information being used to indicate to perform a Primary Cell (PCell) sleep behavior; and performing, by the UE, the PCell sleep behavior for a PCell in accordance with the first information.

In some possible embodiments of the present disclosure, the PCell sleep behavior includes one of stopping monitoring a control channel within an ON duration, suspending from monitoring the control channel within the ON duration, performing sparse control channel monitoring within the ON duration, or monitoring the control channel on a part of search space subsets of a search space set.

In some possible embodiments of the present disclosure, the first information is used to indicate to perform the PCell sleep behavior through first indication resources; or the first information is used to indicate to perform the PCell sleep behavior through the first indication resources and indicate to perform an SCell sleep behavior through second indication resources.

In some possible embodiments of the present disclosure, the first indication further includes third indication resources, and the third indication resources are used to indicate a sleep indication type carried in the first information.

In some possible embodiments of the present disclosure, in the case that the third indication resources indicate a first value, the first information is used to indicate to perform the PCell sleep behavior through the first indication resources, and in the case that the third indication resources indicate a second value, the first information is used to indicate to perform the PCell sleep behavior through the first indication resources and indicate to perform the SCell sleep behavior through the second indication resources.

In some possible embodiments of the present disclosure, in the case that the third indication resources indicate the first value, the first indication resources overlap with target indication resources, and in the case that the first information is used to indicate to perform the SCell sleep behavior, the target indication resources are indication resources for indicating to perform the SCell sleep behavior.

In some possible embodiments of the present disclosure, in the case that the third indication resources indicate the first value, the SCell sleep behavior is indicated through second information.

In some possible embodiments of the present disclosure, in the case that the UE has received third information indicating that the third indication resources indicate a third value, the third information is used to indicate to perform the SCell sleep behavior.

In some possible embodiments of the present disclosure, the first information further includes fourth indication resources. In the case that the fourth indication resources indicate a fourth value, the first information is used to indicate to perform the PCell sleep behavior through the first indication resources, or the first information is used to indicate to perform the PCell sleep behavior through the first indication resources and perform the SCell sleep behavior through the second indication resources.

In some possible embodiments of the present disclosure, the fourth indication resources include a Frequency Domain Resource Allocation (FDRA) field in the first information.

In some possible embodiments of the present disclosure, the first indication resources are indication resources in the first information other than fifth indication resources, and the fifth indication resources are used to indicate at least one of a Modulation and Coding Scheme (MCS), a New Data Indicator (NDI), a Hybrid Automatic Repeat reQuest (HARD) process number or an antenna port.

In some possible embodiments of the present disclosure, the second indication resources are used to indicate the SCell sleep behavior through an SCell group.

In some possible embodiments of the present disclosure, the first information is non-scheduled Downlink Control Information (DCI) or scheduled DCI.

In some possible embodiments of the present disclosure, the UE performs the PCell sleep behavior on a designated sleep BandWidth Part (BWP); or the UE performs the PCell sleep behavior on a currently-activated BWP.

In some possible embodiments of the present disclosure, the designated sleep BWP is configured with a sparse control channel monitoring period, a frequency of monitoring, by the UE, the control channel in the sparse control channel monitoring period is smaller than a predetermined value, and/or the sparse control channel monitoring period is selected from a predetermined period set.

In some possible embodiments of the present disclosure, in the case that the UE has been switched to the designated sleep BWP, a timer is maintained, and the UE does not monitor the control channel before the expiration of the timer.

In some possible embodiments of the present disclosure, in the case that the UE performs the PCell sleep behavior on the currently-activated BWP: the UE is switched from a first control channel monitoring period to a second control channel monitoring period on the currently-activated BWP, a frequency of monitoring, by the UE, and the control channel in the second control channel monitoring period is smaller than a frequency of monitoring, by the UE, the control channel in the first control channel monitoring period; and/or the UE performs skipping of one or more monitoring occasions on the currently-activated BWP; and/or the UE monitors the control channel in a first search space group in a plurality of search space groups on the currently-activated BWP, a frequency of monitoring, by the UE, the control channel in the first search space group is smaller than a frequency of monitoring, by the UE, the control channel in a second search space group, and the second search space group is a search space group in the plurality of search space groups different from the first search space group.

In some possible embodiments of the present disclosure, the UE is switched from the first control channel monitoring period to the second control channel monitoring period in accordance with signaling from a network side.

In some possible embodiments of the present disclosure, the first information is scrambled with a predetermined sequence.

In some possible embodiments of the present disclosure, the predetermined sequence includes a Power Saving Radio Network Temporary Identifier (PS-RNTI).

In some possible embodiments of the present disclosure, the UE performs the PCell sleep behavior for the PCell after transmitting a Hybrid Automatic Repeat reQuest Acknowledgement (HARQ-ACK) for the first information.

In another aspect, the present disclosure provides in some embodiments a sleep indication method, including transmitting, by a network side device, first information, the first information being used to indicate to perform a PCell sleep behavior.

In some possible embodiments of the present disclosure, the PCell sleep behavior includes one of stopping monitoring a control channel within an ON duration, suspending from monitoring the control channel within the ON duration, performing sparse control channel monitoring within the ON duration, or monitoring the control channel on a part of search space subsets of a search space set.

In some possible embodiments of the present disclosure, the first information is used to indicate to perform the PCell sleep behavior through first indication resources; or the first information is used to indicate to perform the PCell sleep behavior through the first indication resources and indicate to perform an SCell sleep behavior through second indication resources.

In some possible embodiments of the present disclosure, the first indication further includes third indication resources, and the third indication resources are used to indicate a sleep indication type carried in the first information.

In some possible embodiments of the present disclosure, in the case that the third indication resources indicate a first value, the first information is used to indicate to perform the PCell sleep behavior through the first indication resources, and in the case that the third indication resources indicate a second value, the first information is used to indicate to perform the PCell sleep behavior through the first indication resources and indicate to perform the SCell sleep behavior through the second indication resources.

In some possible embodiments of the present disclosure, in the case that the third indication resources indicate the first value, the first indication resources overlap with target indication resources, and in the case that the first information is used to indicate to perform the SCell sleep behavior, the target indication resources are indication resources for indicating to perform the SCell sleep behavior.

In some possible embodiments of the present disclosure, in the case that the third indication resources indicate the first value, the SCell sleep behavior is indicated through second information.

In some possible embodiments of the present disclosure, in the case that the network side device has transmitted third information indicating that the third indication resources indicate a third value, the third information is used to indicate to perform the SCell sleep behavior.

In some possible embodiments of the present disclosure, the first information further includes fourth indication resources. In the case that the fourth indication resources indicate a fourth value, the first information is used to indicate to perform the PCell sleep behavior through the first indication resources, or the first information is used to indicate to perform the PCell sleep behavior through the first indication resources and perform the SCell sleep behavior through the second indication resources.

In some possible embodiments of the present disclosure, the fourth indication resources include an FDRA field in the first information.

In some possible embodiments of the present disclosure, the first indication resources are indication resources in the first information other than fifth indication resources, and the fifth indication resources are used to indicate at least one of an MCS, an NDI, an HARQ process number or an antenna port.

In some possible embodiments of the present disclosure, the second indication resources are used to indicate the SCell sleep behavior through an SCell group.

In some possible embodiments of the present disclosure, the first information is non-scheduled DCI or scheduled DCI.

In some possible embodiments of the present disclosure, the PCell sleep behavior is a PCell sleep behavior performed on a designated sleep BWP; or the PCell sleep behavior is a PCell sleep behavior performed on a currently-activated BWP.

In some possible embodiments of the present disclosure, the designated sleep BWP is configured with a sparse control channel monitoring period, a frequency of monitoring, by a UE, the control channel in the sparse control channel monitoring period is smaller than a predetermined value, and/or the sparse control channel monitoring period is selected from a predetermined period set.

In some possible embodiments of the present disclosure, in the case that the PCell sleep behavior is a PCell sleep behavior performed on the designated sleep BWP, the PCell sleep behavior includes: switching the UE from a first control channel monitoring period to a second control channel monitoring period on the currently-activated BWP, a frequency of monitoring, by the UE, the control channel in the second control channel monitoring period being smaller than a frequency of monitoring, by the UE, the control channel in the first control channel monitoring period; and/or performing skipping of one or more monitoring occasions on the currently-activated BWP; and/or monitoring the control channel in a first search space group in a plurality of search space groups on the currently-activated BWP, a frequency of monitoring, by the UE, the control channel in the first search space group being smaller than a frequency of monitoring, by the UE, the control channel in a second search space group, and the second search space group being a search space group in the plurality of search space groups different from the first search space group.

In some possible embodiments of the present disclosure, the network side device indicates the UE to be switched from the first control channel monitoring period to the second control channel monitoring period in accordance with signaling from a network side.

In some possible embodiments of the present disclosure, the first information is scrambled with a predetermined sequence.

In some possible embodiments of the present disclosure, the predetermined sequence includes a PS-RNTI.

In yet another aspect, the present disclosure provides in some embodiments a UE, including: a reception module configured to receive first information, the first information being used to indicate to perform a PCell sleep behavior; and an execution module configured to perform the PCell sleep behavior for a PCell in accordance with the first information.

In still yet another aspect, the present disclosure provides in some embodiments a network side device, including a transmission module configured to transmit first information, the first information being used to indicate to perform a PCell sleep behavior.

In still yet another aspect, the present disclosure provides in some embodiments a UE, including a transceiver, a memory, a processor, and a program instruction stored in the memory and executed by the processor. The processor is configured to: receive first information, the first information being used to indicate to perform a PCell sleep behavior; and perform the PCell sleep behavior for a PCell in accordance with the first information.

In some possible embodiments of the present disclosure, the first information is used to indicate to perform the PCell sleep behavior through first indication resources; or the first information is used to indicate to perform the PCell sleep behavior through the first indication resources and indicate to perform an SCell sleep behavior through second indication resources.

In still yet another aspect, the present disclosure provides in some embodiments a network side device, including a transceiver, a memory, a processor, and a program instruction stored in the memory and executed by the processor. The processor is configured to transmit first information, and the first information is used to indicate to perform a PCell sleep behavior.

In some possible embodiments of the present disclosure, the first information is used to indicate to perform the PCell sleep behavior through first indication resources; or the first information is used to indicate to perform the PCell sleep behavior through the first indication resources and indicate to perform an SCell sleep behavior through second indication resources.

In still yet another aspect, the present disclosure provides in some embodiments a computer-readable storage medium storing therein a program instruction. The program instruction is executed by a processor, so as to implement the steps of the above-mentioned sleep indication method for the UE, or the step of the above-mentioned sleep indication method for the network side device.

According to the embodiments of the present disclosure, the UE receives the first information, and the first information is used to indicate to perform the PCell sleep behavior. Then, the UE performs the PCell sleep behavior for the PCell in accordance with the first information. Because the UE is capable of performing the PCell sleep behavior, it is able to reduce the power consumption of the UE.

DETAILED DESCRIPTION

In order to make the objects, the technical solutions and the advantages of the present disclosure more apparent, the present disclosure will be described hereinafter in a clear and complete manner in conjunction with the drawings and embodiments.

Figure 1:
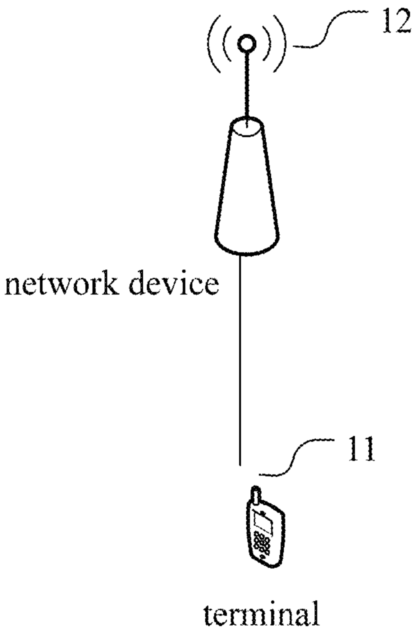
FIG. 1 is a schematic view showing an applicable network according to one embodiment of the present disclosure.

FIG. 1 shows an applicable network according to one embodiment of the present disclosure. As shown in FIG. 1, the network includes a terminal 11 and a network side device 12. The terminal 11 may be a User Equipment (UE) or any other terminal device, e.g., mobile phone, tablet personal computer, laptop computer, Personal Digital Assistant (PDA), Mobile Internet Device (MID), wearable device, robot or vehicle. It should be appreciated that, a specific type of the terminal will not be particularly defined herein. The network side device may be Transmission Reception Point (TRP), and it may be applied to a multi-TRP scenario. Further, the network side device may be an access network device, e.g., a base station (e.g., a macro base station, a Long Term Evolution (LTE) evolved Node B (eNB) or a 5G New Radio (NR) NB)), a micro base station (e.g., a Low Power Node (LPN), a pico base station or a femto base station), an Access Point (AP), or a Central Unit (CU). It should be appreciated that, a specific type of the network side device will not be particularly defined herein.

Figure 2:
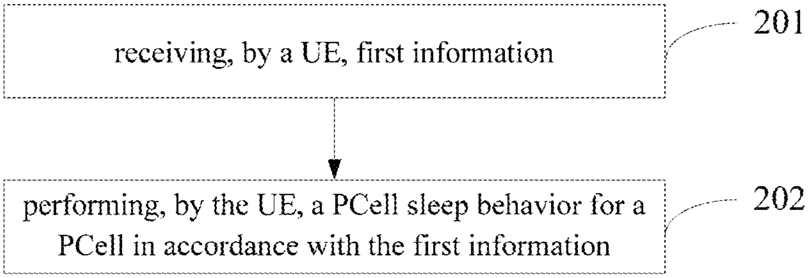
FIG. 2 is a flow chart of a sleep indication method according to one embodiment of the present disclosure.

As shown in FIG. 2, the present disclosure provides in some embodiments a sleep indication method for a UE, which includes: Step 201 of receiving, by the UE, first information, the first information being used to indicate to perform a PCell sleep behavior; and Step 202 of performing, by the UE, the PCell sleep behavior for a PCell in accordance with the first information.

In Step 201, the UE receives the first information from a network side device. The first information is control information, e.g., DCI. Of course, in the embodiments of the present disclosure, the first information is not limited to the control information, and it may be any other indication signaling, e.g., Radio Resource Control (RRC) signaling.

When the first information is used to indicate to perform the PCell sleep behavior, it means that the first information is at least used to indicate to perform the PCell sleep behavior, and it may also be used to indicate or not indicate any other content. In addition, the first information is UE-specific DCI. Of course, the first information is not limited to the UE-specific DCI, and it may also be non-specific information.

The performing, by the UE, the PCell sleep behavior for the PCell in accordance with the first information includes determining the above-mentioned indication content upon the receipt of the first information, and performing the PCell sleep behavior for the PCell.

According to the embodiments of the present disclosure, through the above-mentioned steps, it is able to indicate the UE to perform the PCell sleep behavior, thereby to reduce the power consumption of the UE.

In some possible embodiments of the present disclosure, the PCell sleep behavior includes one of stopping monitoring a control channel within an ON duration, suspending from monitoring the control channel within the ON duration, performing sparse control channel monitoring within the ON duration, or monitoring the control channel on a part of search space subsets of a search space set.

The ON duration is a Discontinuous Reception (DRX) ON duration, and the control channel is a Physical Downlink Control Channel (PDCCH).

The sparse control channel monitoring refers to that a frequency of monitoring the control channel is smaller than a frequency of monitoring the control channel for the PCell where the PCell sleep behavior is not performed. For example, the UE is switched to a sparse period to monitor the control channel (i.e., switched to a monitoring period where the monitoring frequency is relatively low), so as to perform the sparse control channel monitoring within the ON duration. The UE may also skip over one or more monitoring occasions, so as to perform the sparse control channel monitoring within the ON duration. Alternatively, the UE may monitor the control channel on a search space group where the monitoring frequency is relatively low, so as to perform the sparse control channel monitoring within the ON duration. In addition, the sparse period is agreed in a protocol or configured at a network side.

The monitoring the control channel on a part of search space subsets of the search space set includes dividing the search space set into a plurality of search space subsets, and monitoring, by the UE, the control channel on a part of the search space subsets, so as to further reduce the power consumption of the UE.

During the implementation, the UE may stop monitoring the control channel, suspend from monitoring the PDCCH, or perform the control channel monitoring with a sparse period within the PCell ON duration.

In some possible embodiments of the present disclosure, the first information is used to indicate to perform the PCell sleep behavior through first indication resources; or the first information is used to indicate to perform the PCell sleep behavior through the first indication resources and indicate to perform an SCell sleep behavior through second indication resources.

The first indication resources are also called as a first resource, and it includes one or more consecutive or non-consecutive bits in the first information. The second indication resources are a second resource, and it includes one or more consecutive or non-consecutive bits in the first information.

When the first information is used to indicate the PCell sleep behavior through the first indication resources, the PCell sleep behavior rather than the SCell sleep behavior is indicated in the first information.

When the first information is used to indicate to perform the PCell sleep behavior through the first indication resources and indicate to perform an SCell sleep behavior through second indication resources, the PCell sleep behavior and the SCell sleep behavior are indicated in the first information simultaneously.

In some possible embodiments of the present disclosure, the first indication further includes third indication resources, and the third indication resources are used to indicate a sleep indication type carried in the first information.

The sleep indication type is a type of a sleep behavior indicated in the first information. For example, as one type, the first information merely indicates the PCell sleep behavior; as another type, the first information indicates both the PCell sleep behavior and the SCell sleep behavior; and as yet another type, the first information merely indicates the SCell sleep behavior.

In addition, the third indication resources include one or more bits.

In some possible embodiments of the present disclosure, in the case that the third indication resources indicate a first value, the first information is used to indicate to perform the PCell sleep behavior through the first indication resources, and in the case that the third indication resources indicate a second value, the first information is used to indicate to perform the PCell sleep behavior through the first indication resources and indicate to perform the SCell sleep behavior through the second indication resources.

The first value and the second value are agreed in a protocol or configured at a network side.

In addition, in the case that the third indication resources indicate the first value, the first indication resources overlap with target indication resources, and in the case that the first information is used to indicate to perform the SCell sleep behavior, the target indication resources are indication resources for indicating to perform the SCell sleep behavior.

When the first indication resources overlap with the target indication resources, the first indication resources are a subset of the target indication resources, or overlap with, e.g., coincide with, the target indication resources.

It should be appreciated that, the target indication resources are the second indication resources in the first information for indicating the SCell sleep behavior, i.e., indication resources for indicating the SCell sleep behavior. In this way, when indicating the PCell sleep behavior in the first information, it is able to reuse the indication resources for indicating the SCell sleep behavior, thereby to reuse information (e.g., DCI) for indicating the SCell sleep behavior.

In addition, in the case that the third indication resources indicate the first value, the SCell sleep behavior is indicated through second information.

The second information and the first information are transmitted through different transmission behaviors.

For example, when the first information is non-scheduled DCI and the third indication resources indicate the first value, the SCell sleep behavior is indicated through scheduled DCI.

Taking 1-bit third indication resources as an example, the following Table 1 is given.

TABLE 1

| PCell sleep type indicator | PCell sleep indicator |
|---|---|
| 1 | The base station indicates the PCell sleep behavior through first resources of DCI, and the DCI is not used to indicate the SCell sleep behavior (the SCell behavior is indicated through scheduled DCI, the first resources are a subset of second resources, or the first resources are different from the second resources, or the first resources overlap with the second resources). |
| 0 | The base station indicates the PCell sleep behavior through the first resources of the DCI, and indicates the SCell sleep behavior through the second resources. |

Further, in the case that the UE has received third information indicating that the third indication resources indicate a third value, the third information is used to indicate to perform the SCell sleep behavior.

When the third information indicates to perform the SCell sleep behavior, the third indication resources of the information (e.g., DCI) received by the UE indicate the third value, and the information is used to indicate to perform the SCell sleep behavior rather than the PCell sleep behavior.

Taking 2-bit third indication resources as an example, the following Table 2 is given.

TABLE 2

| PCell sleep type indicator | PCell sleep indicator |
|---|---|
| 11 | The base station indicates the PCell sleep rather than the SCell sleep behavior through first resources of the DCI (the SCell sleep behavior is indicated through scheduled DCI, the first resources are a subset of second resources, or the first resources are different from the second resources, or the first resources overlap with the second resources). |
| 10 | The base station indicates the PCell sleep behavior through the first resources of the DCI, and indicates the SCell sleep behavior through the second resources. |
| 01 | Reserved |
| 00 | Legacy behavior |

The third value is represented by "00", i.e., the legacy behavior is a behavior defined in a protocol and used in the information received by the UE (the information is the above-mentioned third information, e.g., DCI). For example, it is used to merely indicate the SCell sleep behavior rather than the PCell sleep behavior.

In this way, through the above-mentioned third value, it is able to reuse the information already defined in a protocol.

In some possible embodiments of the present disclosure, the first information further includes fourth indication resources. In the case that the fourth indication resources indicate a fourth value, the first information is used to indicate to perform the PCell sleep behavior through the first indication resources, or the first information is used to indicate to perform the PCell sleep behavior through the first indication resources and indicate to perform the SCell sleep behavior through the second indication resources.

When the first information is used to indicate to perform the PCell sleep behavior through the first indication resources, or the first information is used to indicate to perform the PCell sleep behavior through the first indication resources and indicate to perform the SCell sleep behavior through the second indication resources in the case that the fourth indication resources indicate the fourth value, it may be understood that the first information is used to indicate a cell sleep behavior in the case that the fourth indication resources indicate the fourth value.

In this way, when the UE has received the first information and determined that the fourth indication resources indicate the fourth value, the first information is parsed in accordance with the indicated cell sleep behavior.

Further, the fourth indication resources include an FDRA field in the first information.

For example, the FDRA field includes all 0s or 1s. Of course, the FDRA field may have any other values, which will not be particularly defined herein. In addition, the fourth indication resources are not limited to be the FDRA field. For example, the fourth indication resources may be any other field in the first information, which will not be particularly defined herein.

In some possible embodiments of the present disclosure, the first indication resources are indication resources in the first information other than fifth indication resources, and the fifth indication resources are used to indicate at least one of an MCS, an NDI, an HARQ process number or an antenna port.

During the implementation, the PCell sleep behavior is indicated through indication resources other than the MCS, the NDI, the HARQ process number and the antenna port.

In some possible embodiments of the present disclosure, the second indication resources are used to indicate the SCell sleep behavior through an SCell group.

Through indicating the SCell sleep behavior through the SCell group, it is able to save an overhead for the first information.

In the embodiments of the present disclosure, the first information is non-scheduled DCI or scheduled DCI.

In addition, each of the second information and the third information is DCI having a same type or same format as the first information.

In some possible embodiments of the present disclosure, the UE performs the PCell sleep behavior on a designated sleep BWP; or the UE performs the PCell sleep behavior on a currently-activated BWP.

The sleep BWP is defined in a protocol, or configured at a network side. Of course, it may also be configured by the UE.

During the implementation, the UE performs the PCell sleep behavior on the designated sleep BWP, so as to reduce the complexity of the UE in performing the PCell sleep behavior. In addition, a bandwidth of the designated sleep BWP is smaller than the currently-activated BWP of the UE, so as to reduce the PCell power consumption.

In some possible embodiments of the present disclosure, the designated sleep BWP is configured with a sparse control channel monitoring period, a frequency of monitoring, by the UE, the control channel in the sparse control channel monitoring period is smaller than a predetermined value, and/or the sparse control channel monitoring period is selected from a predetermined period set.

The predetermined value is agreed in a protocol or configured at a network side. The predetermined period set includes one or more periods. When the predetermined period set includes a plurality of periods, a period with a smallest frequency of monitoring the control channel is selected as the sparse control channel monitoring period. Of course, any other period may also be selected as the sparse control channel monitoring period.

In some possible embodiments of the present disclosure, in the case that the UE has been switched to the designated sleep BWP, a timer is maintained, and the UE does not monitor the control channel before the expiration of the timer.

A duration of the timer is agreed in a protocol or configured at a network side.

During the implementation, after the UE has been switched to the sleep BWP, the terminal may maintain the timer, and may not monitor the PDCCH on the sleep BWP before the expiration of the timer. In this way, it is able to ensure that the UE and the network side device understand a time for performing, by the UE, the PCell sleep behavior in a same way.

In some possible embodiments of the present disclosure, in the case that the UE performs the PCell sleep behavior on the currently-activated BWP: the UE is switched from a first control channel monitoring period to a second control channel monitoring period on the currently-activated BWP, a frequency of monitoring, by the UE, and the control channel in the second control channel monitoring period is smaller than a frequency of monitoring, by the UE, the control channel in the first control channel monitoring period; and/or the UE performs skipping of one or more monitoring occasions on the currently-activated BWP; and/or the UE monitors the control channel in a first search space group in a plurality of search space groups on the currently-activated BWP, a frequency of monitoring, by the UE, the control channel in the first search space group is smaller than a frequency of monitoring, by the UE, the control channel in a second search space group, and the second search space group is a search space group in the plurality of search space groups different from the first search space group.

The monitoring occasion skipping refers to the skipping over one or more monitoring occasions.

In addition, the UE is switched from the first control channel monitoring period to the second control channel monitoring period in accordance with signaling from a network side. For example, upon the receipt of signaling for changing a detection period from the network side device, the UE performs a new PDCCH monitoring scheme at a determined time.

Of course, the UE may also determine, by itself, the time to perform the new PDCCH monitoring scheme. In addition, the first search space group may also be indicated through the signaling from a network side or selected by the UE itself.

During the implementation, it is able to support, through various ways, the UE to perform the PCell sleep behavior on the currently-activated BWP.

In some possible embodiments of the present disclosure, the first information is scrambled with a predetermined sequence.

During the implementation, the first information is scrambled with the predetermined sequence, so after the UE has detected the first information scrambled with the predetermined sequence, it is able to determine that the information is used to indicate the cell sleep behavior.

In some possible embodiments of the present disclosure, the predetermined sequence includes a PS-RNTI.

Of course, the predetermined sequence is not limited the PS-RNTI, and it may be any other sequence agreed in a protocol or configured at a network side.

In addition, the first information is transmitted on the PCell. The scrambling includes scrambling the first information or scrambling Cyclic Redundancy Check (CRC) bits corresponding to the first information.

In some possible embodiments of the present disclosure, the UE performs the PCell sleep behavior for the PCell after transmitting an HARQ-ACK for the first information.

When the UE performs the PCell sleep behavior for the PCell after transmitting the HARQ-ACK for the first information, it means that an effective time of the PCell sleep behavior indication indicated in the first information is after the feedback of the HARQ-ACK for the PCell sleep indicator.

In this way, it is able for the UE and the network side device to understand the time for performing, by the UE, the PCell sleep behavior in a same way, thereby to improve the communication performance between the UE and the network side device.

According to the embodiments of the present disclosure, the UE receives the first information, and the first information is used to indicate to perform the PCell sleep behavior. Then, the UE performs the PCell sleep behavior for the PCell in accordance with the first information. Because the UE is capable of performing the PCell sleep behavior, it is able to reduce the power consumption of the UE.

Figure 3:
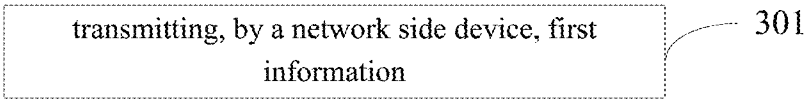
FIG. 3 is another flow chart of the sleep indication method according to one embodiment of the present disclosure.

As shown in FIG. 3, the present disclosure provides in some embodiments a sleep indication method which includes Step 301 of transmitting, by a network side device, first information, the first information being used to indicate to perform a PCell sleep behavior.

In some possible embodiments of the present disclosure, the PCell sleep behavior includes one of stopping monitoring a control channel within an ON duration, suspending from monitoring the control channel within the ON duration, performing sparse control channel monitoring within the ON duration, or monitoring the control channel on a part of search space subsets of a search space set.

In some possible embodiments of the present disclosure, the first information is used to indicate to perform the PCell sleep behavior through first indication resources; or the first information is used to indicate to perform the PCell sleep behavior through the first indication resources and indicate to perform an SCell sleep behavior through second indication resources.

In some possible embodiments of the present disclosure, the first indication further includes third indication resources, and the third indication resources are used to indicate a sleep indication type carried in the first information.

In some possible embodiments of the present disclosure, in the case that the third indication resources indicate a first value, the first information is used to indicate to perform the PCell sleep behavior through the first indication resources, and in the case that the third indication resources indicate a second value, the first information is used to indicate to perform the PCell sleep behavior through the first indication resources and indicate to perform the SCell sleep behavior through the second indication resources.

In some possible embodiments of the present disclosure, in the case that the third indication resources indicate the first value, the first indication resources overlap with target indication resources, and in the case that the first information is used to indicate to perform the SCell sleep behavior, the target indication resources are indication resources for indicating to perform the SCell sleep behavior.

In some possible embodiments of the present disclosure, in the case that the third indication resources indicate the first value, the SCell sleep behavior is indicated through second information.

In some possible embodiments of the present disclosure, in the case that the network side device has transmitted third information indicating that the third indication resources indicate a third value, the third information is used to indicate to perform the SCell sleep behavior.

In some possible embodiments of the present disclosure, the first information further includes fourth indication resources. In the case that the fourth indication resources indicate a fourth value, the first information is used to indicate to perform the PCell sleep behavior through the first indication resources, or the first information is used to indicate to perform the PCell sleep behavior through the first indication resources and perform the SCell sleep behavior through the second indication resources.

In some possible embodiments of the present disclosure, the fourth indication resources include an FDRA field in the first information.

In some possible embodiments of the present disclosure, the first indication resources are indication resources in the first information other than fifth indication resources, and the fifth indication resources are used to indicate at least one of an MCS, an NDI, an HARQ process number or an antenna port.

In some possible embodiments of the present disclosure, the second indication resources are used to indicate the SCell sleep behavior through an SCell group.

In some possible embodiments of the present disclosure, the first information is non-scheduled DCI or scheduled DCI.

In some possible embodiments of the present disclosure, the PCell sleep behavior is a PCell sleep behavior performed on a designated sleep BWP; or the PCell sleep behavior is a PCell sleep behavior performed on a currently-activated BWP.

In some possible embodiments of the present disclosure, the designated sleep BWP is configured with a sparse control channel monitoring period, a frequency of monitoring, by a UE, the control channel in the sparse control channel monitoring period is smaller than a predetermined value, and/or the sparse control channel monitoring period is selected from a predetermined period set.

In some possible embodiments of the present disclosure, in the case that the PCell sleep behavior is a PCell sleep behavior performed on the designated sleep BWP, the PCell sleep behavior includes: switching the UE from a first control channel monitoring period to a second control channel monitoring period on the currently-activated BWP, a frequency of monitoring, by the UE, the control channel in the second control channel monitoring period being smaller than a frequency of monitoring, by the UE, the control channel in the first control channel monitoring period; and/or performing skipping of one or more monitoring occasions on the currently-activated BWP; and/or monitoring the control channel in a first search space group in a plurality of search space groups on the currently-activated BWP, a frequency of monitoring, by the UE, the control channel in the first search space group being smaller than a frequency of monitoring, by the UE, the control channel in a second search space group, and the second search space group being a search space group in the plurality of search space groups different from the first search space group.

In some possible embodiments of the present disclosure, the network side device indicates the UE to be switched from the first control channel monitoring period to the second control channel monitoring period in accordance with signaling from a network side.

In some possible embodiments of the present disclosure, the first information is scrambled with a predetermined sequence.

In some possible embodiments of the present disclosure, the predetermined sequence includes a PS-RNTI.

It should be appreciated that, the method in the embodiments of the present disclosure corresponds to the network side device in FIG. 2, and the implementation of the method may refer to the above-mentioned relevant description with a same technical effect, which will not be particularly defined herein.

The sleep indication method will be illustratively described hereinafter when the first information is DCI.

First Embodiment

In actual use, in order to rapidly obtain Channel State Information (CSI) reports from SCells and reduce the power consumption for activating the SCells, the base station at first activates the SCells, and when no data is transmitted by an SCell, the base station notifies the UE to perform the SCell sleep behavior rather than deactivating the Scells. Specifically, the SCell sleep behavior is defined as that the UE does not monitor the PDCCH on the activated SCells but still performs CSI measurement and reporting. For the PCells, when the UE performs a same sleep behavior as the SCell, i.e., the UE does not monitor the PDCCH on the PCells, it is impossible to schedule the UE. In this embodiment of the present disclosure, the PCell sleep behavior mainly aims to reduce the PDCCH monitoring behaviors within a PCell ON duration, thereby to reduce the power consumption. The PDCCH sleep behavior includes: stopping, by the UE, monitoring the control channel within the PCell ON duration, or suspending from monitoring the PDCCH, or performing the control channel monitoring with a sparse period, or switching a search space set for PDCCH monitoring, or merely monitoring the control channel on a part of search space subsets of the search space set. For the stopping monitoring the control channel, when there is a DRX configuration, the UE stops monitoring the control channel within the DRX after data transmission. For the suspending from monitoring the PDCCH, it mainly includes currently not monitoring the PDCCH within an agreed time period in accordance with signaling, or monitoring the PDCCH through switching to a Search Space (SS) set with a sparser period, or monitoring the PDCCH with a sparser monitoring period for a same SS set. More specifically, the PCell sleep behavior is performed through at least one of, but not limited to, the following schemes, or a combination thereof, or enhancements thereof.

First Scheme: when a UE in an RRC connected mode performs data transmission within an ON duration, a designated sleep downlink BWP is defined on the PCell, and the BWP has a small bandwidth. In addition, the sleep downlink BWP is configured with a sparse PDCCH monitoring period which is smaller than a predetermined value, e.g., 50 ms. When the PCell needs to be in a sleep mode within the ON duration, the base station transmits layer1 (L1) signaling to indicate the UE to be switched to the sleep BWP. On the sleep BWP, the UE monitors the PDCCH in accordance with the sparse period. Alternatively, after the UE has been switched to the sleep BWP, a timer is maintained, and the UE does not monitor the PDCCH on the sleep BWP before the expiration of the timer. A value of the timer is configured by the base station in advance through high-layer signaling. The UE continues to perform the CSI measurement and report a measurement result on the sleep BWP. The UE monitors the PDCCH on the sleep BWP directly in accordance with a sleep BWP configuration, or monitors the control channel in accordance with the sleep BWP configuration after the expiration of the timer. Once the UE detects that the PDCCH includes an indication indicating that the UE is to be switched to a non-sleep BWP, the UE is switched back to the non-sleep DL BWP to monitor the PDCCH with a dense bandwidth. Through this method, it is able to suspend from monitoring the control channel on a designated sleep BWP with a small bandwidth or monitor a sparse control channel, thereby to reduce the power consumption of the PCell.

The base station configures a plurality of periods for one search space on the sleep BWP on the PCell, and the UE selects a sparse monitoring period from a predetermined period set, e.g., {10 ms, 50 ms, 100 ms, 200 ms}, in accordance with an indication from the base station, e.g., an Medium Access Control Control Element (MAC CE) indication. The base station indicates a PDCCH monitoring period for the UE after the UE has been switched to the BWP through MAC CE signaling or L1 signaling for triggering the switching to the sleep BWP. A numerical value of the period is remarkably greater than 1. The larger the value, the fewer the PDCCHs to be monitored and the lower the power consumption. In addition, the larger the value, the larger the resultant delay. Through this method, it is able for the base station to flexibly configure the monitoring period.

Second Scheme: the base station does not configure the sleep BWP, and changes a current PDCCH monitoring period on a currently-activated BWP through L1 signaling. For example, the base station notifies, through L1 signaling, the UE of a scaling factor for a period of a search space. The scaling factor is used to indicate that a new PDCCH detection period is an integral multiple of an original period. For example, when the base station configures a search space with a detection period of 1 for the UE, “00” represents that the original PDCCH monitoring period configured by the base station is not changed, i.e., the new PDCCH detection period is the same as the original PDCCH detection period; “01” represents that the new PDCCH detection period is five times of the original PDCCH detection period; “10” represents that the new PDCCH detection period is ten times of the original PDCCH detection period; and “11” represents that the new PDCCH detection period is twenty times of the original PDCCH detection period. The base station notifies, through L1 signaling on the PCell, the UE to change the detection period. Upon the receipt of “00”, the UE restores the original PDCCH detection period. After receiving the indication from the base station indicating that the detection period is to be changed, the UE performs the new PDCCH monitoring scheme at a determined time. For example, a timer is agreed by the base station with the UE, and after the expiration of the timer, the new PDCCH monitoring period is effective. In this way, it is able for the base station and the UE to understand the time in a same way. For example, after the UE returns the HARQ-ACK, the data transmission is performed between the base station and the UE in accordance with the new PDCCH monitoring period.

Third Scheme: the base station does not configure the sleep BWP, and performs PDCCH skipping on the currently-activated BWP of the PCell. The base station notifies, through L1 signaling, the UE to skip the PDCCH monitoring over M Monitoring Occasions (MOs), where M is an integer greater than or equal to 1. For example, a detection period configured for a current search space period is T, and the UE is indicated to skip over M MOs through L1 signaling. When the UE skips over the MOs in accordance with the indication and fails to detect any new L1 signaling indication, the UE may restores the PDCCH monitoring in accordance with an original configuration. Alternatively, the UE continues to perform the PDCCH monitoring skipping in accordance with a default detection period configured by the base station in advance through designated signaling. Here, the default detection period is not necessarily equal to the PDCCH detection period used before the PDCCH skipping. The UE continues to perform the CSI measurement and reporting in a sleep time period for the PDCCH monitoring skipping.

Fourth Scheme: the base station does not configure the sleep BWP, and configures a plurality of PDCCH search space groups for the UE within the currently-activated BWP of the PCell. For example, a monitoring period for one PDCCH search space group i is Ti, and a monitoring period for another PDCCH search space j is Tj, where Ti<<Tj. When the UE needs to be in a sleep mode on the PCell, the base station indicates, through L1 signaling, the UE to perform the PDCCH monitoring in the search space group i. When the UE needs to exit from the sleep mode on the PCell, the base station indicates, through L1 signaling, the UE to perform the PDCCH monitoring in the search space group j.

Fifth Scheme: the base station does not configure the sleep BWP, and configures a PDCCH search space set for the UE on the currently-activated BWP of the PCell, and one search space set is divided into a plurality of subsets. For example, depending on different aggregation levels, the search space set is divided into a plurality of subsets. For a search space set with a period of T, it is divided into three subsets in accordance with AL={2, 4}, AL={8} and AL={16}. The search space set is divided into subsets in various ways. Apart from the aggregation levels, the search space set may also be divided into subsets in accordance with the quantity of PDCCH candidates. For example, within a search space corresponding to one PDCCH detection occasion, every L PDCCH candidates form one search space subset. The search space set may further be divided into subsets in accordance with a time domain. For example, a search space period configured by the base station is T, and a period of the above-mentioned search space is K*T, where K is a natural number. On a corresponding MO, when K>1, a search space subset with a period of KT is formed. The base station indicates, through L1 signaling, the UE to monitor the PDCCH merely in the search space subset.

Apart from the above-mentioned method, any other methods for reducing the PDCCH monitoring on the PCell, e.g., a method of indicating the UE to merely monitor the search space subset within the original monitoring period, may also be considered as a sleep indication method on the PCell.

Second Embodiment

In this embodiment, the PCell sleep behavior based on BWP switching is indicated through scheduled or non-scheduled DCI, and the BWP switching is performed through, but not limited to, a BWP switching field.

The base station transmits UE-specific DCI on the PCell to indicate the UE to perform the PCell sleep behavior. The DCI is non-scheduled DCI or scheduled DCI.

Figure 4:
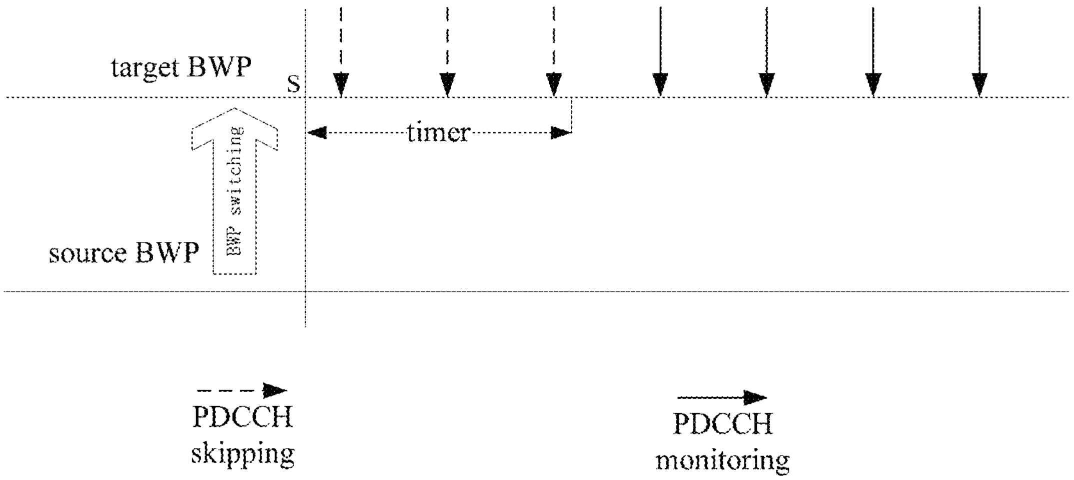
FIG. 4 is a schematic view showing a sleep indicator according to one embodiment of the present disclosure.

More specifically, the base station indicates the PCell sleep behavior through a DCI format 1_1/0_1 or DCI format 0_2/1_2 transmitted on the PCell. For example, the base station configures the designated sleep BWP for the UE on the PCell through RRC signaling. When the UE needs to be in the sleep mode on the PCell, the base station reuses the BWP switching field in the scheduled DCI to indicate the UE to be switched to the sleep BWP. In this scheme, it is able to reuse a BWP switching structure already defined in a protocol, thereby to reduce the complexity. The base station may also reuse some fields in the non-scheduled DCI to indicate the UE to be switched from a non-sleep BWP to the sleep BWP or switched from the sleep BWP to the non-sleep BWP on the PCell. Taking DCI format 1_1/0_1 as an example, the reused fields include a Sounding Reference Signal (SRS) request field. When a bit in the field is 0, it means that the UE needs to reside on the current non-sleep BWP or to be switched to the non-sleep BWP. When the bit in the field is 1, it means that the UE needs to reside on the sleep BWP or to be switched from the non-sleep BWP to the sleep BWP on the PCell. After the UE has been switched to the sleep BWP, the UE uses a sparse control channel detection period. Alternatively, after the UE has been switched to the sleep BWP, a timer is maintained by the UE, and the UE does not perform the PDCCH monitoring on the sleep BWP before the expiration of the timer. As shown in FIG. 4, a source BWP is a non-sleep BWP, and a target BWP is a sleep BWP. After the UE has been switched to the target BWP in accordance with the signaling from the base station, the UE does not perform the PDCCH monitoring within duration of the timer with S as a start point, where S is a time point pre-agreed by the base station with the UE. After the expiration of the timer, the UE starts to monitor the PDCCH in accordance with a configuration of the target BWP. In this scheme, after the UE has been switched to the target BWP, in order to reduce the power consumption, usually a large or very sparse detection period needs to be configured. However, the target BWP belongs to the PCell, and when the very sparse or very big PDCCH detection period is configured, a large scheduling delay may occur for the base station, although it is able to reduce the power consumption. Hence, in this scheme, after the BWP switching, the UE does not perform the PDCCH detection within an agreed time period, and then perform the PDCCH detection in accordance with a PDCCH detection period configured on the target BWP, so as to reduce the power consumption of the UE, and prevent the occurrence of a too large scheduling delay on the target BWP through configuring the PDCCH detection period appropriately. In this method, the sleep BWP is merely for illustrative purposes, and the target BWP is not limited to the sleep BWP, e.g., it may be any BWP configured by the base station. Once the UE has detected that the PDCCH includes an indication indicating the UE to be switched to the non-sleep BWP, the UE is switched to the non-sleep downlink BWP to perform the PDCCH monitoring with a dense bandwidth. Through this method, it is able to suspend from monitoring the control channel or monitor the control channel with a sparse period on the designated sleep BWP with a small bandwidth, thereby to reduce the power consumption of the PCell. The sparse channel detection period configured by the base station on the sleep BWP is not smaller than a first predetermined value, e.g., 50 ms, and a time period configured by the base station within which the control channel is not monitored on the sleep BWP is not smaller than a second predetermined value, e.g., 100 ms. In this scheme, it is able for the UE to skip over a plurality of PDCCH detection occasions on the sleep BWP, thereby to make a compromise between the reduction in the power consumption of the UE and the scheduling delay of the base station on the PCell.

Third Embodiment

In this embodiment, the DCI is non-scheduled DCI.

The base station transmits UE-specific non-scheduled DCI on the Pscell so as to indicate the UE to perform the PCell sleep behavior. For example, a non-scheduled DCI format 1_1/0_1 transmitted on the PCell is reused by the base station to indicate the PCell sleep behavior. A specific value of a specific field (i.e., the above-mentioned fourth indication resource) of the DCI is used to identify the non-scheduled DCI. For example, when an FDRA of the DCI includes all 1s or 0s, the PCell sleep behavior is indicated as follows.

The third resources in the DCI are used by the base station to indicate a sleep type, and the PCell sleep behavior is indicated through the first resource. For example, a sleep type indication is carried in a predetermined field, i.e., the DCI is used to indicate the SCell sleep behavior or the PCell sleep behavior, or both.

Figure 5:
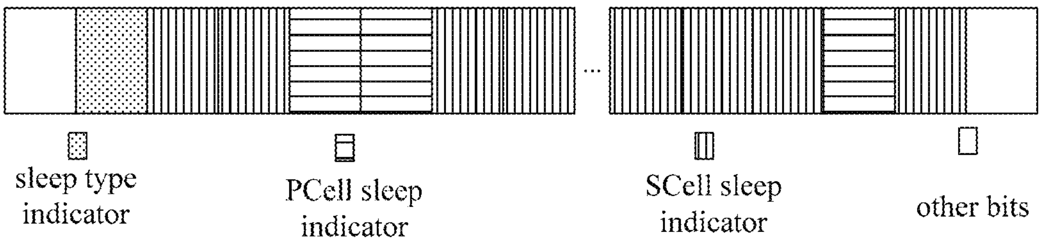
FIG. 5 is another schematic view showing the sleep indicator according to one embodiment of the present disclosure.

As shown in FIG. 5, an original carrier indicator field or an original BWP switching field of the DCI format 1_1/0_1 is used as the third resource to carry the sleep type indication. When a bit of the field has a value of 1, it means that the DCI is used to indicate the PCell sleep behavior and the SCell sleep behavior simultaneously. In FIG. 5, the first resource is used to carry the PCell sleep indicator bits which are consecutive, or non-consecutive as shown in FIG. 4. The base station needs to notify, through RRC signaling or a pre-agreed mode, the UE so that the UE is capable of determining positions of the PCell sleep indicator bits. These positions shall not be positions of bits of an original SCell sleep indicator already defined in a protocol, i.e., the PCell sleep bits need to occupy resources other than fields for the MCS, the NDI, the RV, the HARQ process number and the antenna port. As shown in FIG. 5, the second resources in the DCI are used to indicate the SCell sleep behavior. The second resources are resources for the SCell sleep behavior already defined in a protocol, and a carried SCell sleep indicator reuses an SCell sleep indicator already defined in a protocol or it is different from an SCell sleep behavior already defined in a protocol. The SCell sleep behavior different from that already defined in a protocol refers to an SCell sleep behavior with a same sleep type as the PCell. For example, the SCells are divided by the base station into a plurality of groups, and each group corresponds to a same sleep behavior. When the PCell sleep behavior in the first embodiment of the present disclosure corresponds to PDCCH monitoring skipping, the SCells are divided by the base station into groups, and a time period for the PDCCH monitoring skipping corresponding to each SCell group is the same, e.g., 10 ms. The other bits are bits that shall not be occupied no matter whether the PCell sleep behavior or the SCell sleep behavior is indicated, e.g., the above-mentioned FDRA field, a DCI uplink/downlink indication field, or an original BWP switching field. In this scheme, it is able to indicate the UE to perform the PCell sleep behavior, or to indicate perform both the PCell sleep behavior and the SCell sleep behavior, e.g., to indicate the UE to perform the SCell sleep behavior on the SCell different from that already defined in a protocol. When the SCell sleep behavior is a behavior already defined in a protocol, it is able to facilitate the fallback compatibility through the DCI design, and a target protocol UE merely needs to identify the SCell sleep behavior. In this embodiment of the present disclosure, the UE may parse the PCell sleep behavior and the SCell sleep behavior simultaneously. It should be appreciated that, the sleep type indication is not limited to one bit, and the 1-bit sleep type indication is merely used for ease of description.

Figure 6:
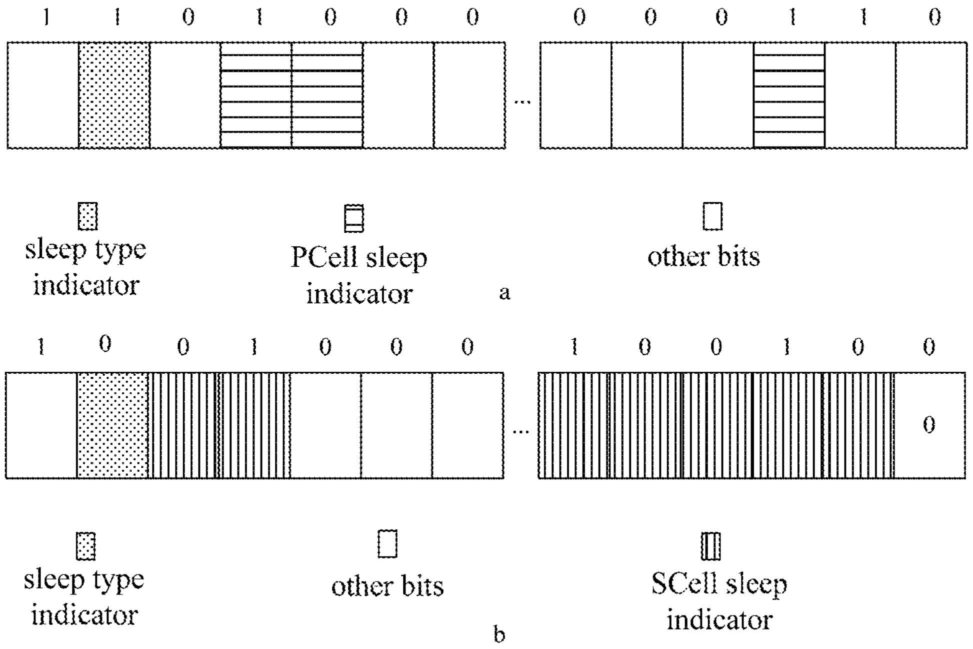
FIG. 6 is yet another schematic view showing the sleep indicator according to one embodiment of the present disclosure.

For example, as shown in FIG. 6, the third resources are used to carry the sleep type indication. For example, when the bits of the third resources have a value of 0, the PCell sleep indicator is carried by the first resource, as shown by "a" in FIG. 6; and when the bits of the third resources have a value of 0, the SCell sleep indicator is carried by the second resource, as shown by "b" in FIG. 6. Meanings of the other bits are the same as those in FIG. 4, and thus will not be particularly defined herein. At this time, DCI format 1_1/0_1 is merely used to indicate the PCell sleep behavior or the SCell sleep behavior. The first resources are a subset of the second resources or the same as the third resources. In this operating mode, it is able to reduce the indication complexity, thereby to reduce an overhead for the DCI. Generally, when no data i s transmitted by the PCell, the SCell is probably in a sleep state, so it is unnecessary to indicate the SCell sleep behavior through additional bits. The SCell sleep behavior is an SCell sleep behavior already defined in a protocol.

Figure 7:
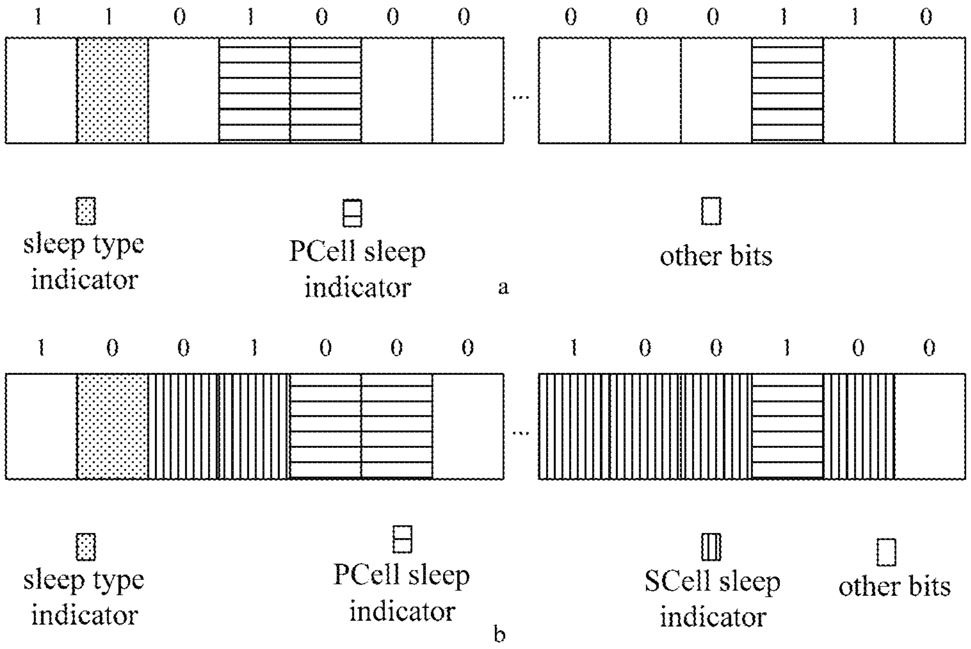
FIG. 7 is still yet another schematic view showing the sleep indicator according to one embodiment of the present disclosure.

For another example, as shown in FIG. 7, the third resources are used to carry the sleep type indicator. For example, when the bits of the third resources have a value of 1, the PCell sleep indicator is carried by the first resources. In this case, the SCell sleep behavior is not carried by the DCI, as shown by "a" in FIG. 7, i.e., the SCell sleep behavior is carried by the scheduled DCI. When the bits of the third resources have a value of 0, the PCell sleep indicator is carried by the first resources, and the SCell sleep indicator is carried by the second resources, as shown by "b" in FIG. 7, i.e., the SCell sleep behavior is not carried by the scheduled DCI. The meanings of the other bits are the same as those in FIG. 5, and thus will not be particularly defined herein. At this time, DCI format 1_1/0_1 is merely used to indicate the PCell sleep behavior or the SCell sleep behavior. The first resources are a subset of the second resources, or the same as the second resources. In this operating mode, it is able to indicate the PCell sleep behavior and the SCell sleep behavior in accordance with whether the sleep behavior is carried in the scheduled DCI, as shown in the above Table 1 or Table 2, which will not be particularly defined herein.

Fourth Embodiment

In this embodiment, the DCI is non-scheduled DCI.

The base station transmits UE-specific non-scheduled DCI on the Pscell so as to indicate the UE to perform the PCell sleep behavior. For example, a non-scheduled DCI format 1_1/0_1 transmitted on the PCell is reused by the base station to indicate the PCell sleep behavior. When an FDRA of the DCI includes all 1s or 0s, the PCell sleep behavior is indicated as follows.

The base station indicates the PCell sleep behavior through the first resources in the DCI, and indicates the SCell sleep behavior through the second resources.

Figure 8:
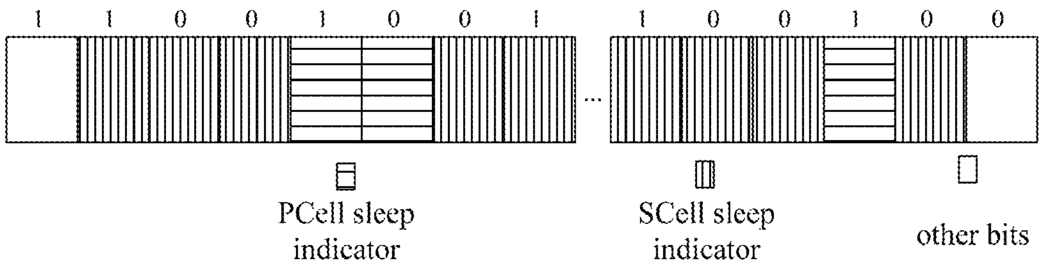
FIG. 8 is still yet another schematic view showing the sleep indicator according to one embodiment of the present disclosure.

As shown in FIG. 8, the PCell sleep indicator is carried through the first resources in DCI format 1_1/0_1, and positions of the bits of the PCell sleep indicator are consecutive, or non-consecutive as shown in FIG. 6. The base station needs to notify, through RRC signaling or a pre-agreed mode, the UE, so that the UE is capable of determining the positions of the PCell sleep indicator bits. These positions shall not be positions of bits of an original SCell sleep indicator already defined in a protocol, i.e., the PCell sleep bits need to occupy resources other than fields for the MCS, the NDI, the RV, the HARQ process number and the antenna port. As shown in FIG. 8, the second resources in the DCI are used to indicate the SCell sleep indicator. The second resources are original resources defined in Rel-16 for the SCell sleep behavior, and the resources are used to carry the sleep indicator already defined in a protocol. In FIG. 8, the meanings of the other bits are the same as those in FIG. 5. A beneficial effect of this scheme is similar to that mentioned in the third embodiment, i.e., it is able to indicate the PCell sleep behavior, or indicate the PCell sleep behavior and the SCell sleep behavior. Different from that in the third embodiment, in this embodiment, there is no field for the sleep type indication, and the PCell sleep indicator does not occupy the resources for the SCell sleep indicator.

Fifth Embodiment

Different from the third and fourth embodiments, in this embodiment, the DCI is scrambled with a PS-RNTI.

The base station transmits UE-specific non-scheduled DCI on the PCell so as to indicate the UE to perform the PCell sleep behavior. For example, a non-scheduled DCI format 1_1/0_1 transmitted on the PCell is reused by the base station to indicate the PCell sleep behavior. However, different from the third and fourth embodiments, the non-scheduled DCI is not identified through a specific field in the DCI. The DCI or a corresponding CRC bit of the DCI is scrambled by the base station with a predetermined sequence. When the DCI is scrambled with the predetermined sequence, the DCI is scrambled with the sequence at a frozen bit of a polar code. The predetermined sequence is a PS-RNTI already defined in a protocol. A search space for the non-scheduled DCI is a search space configured by the base station for DCI format 2_6, and it is transmitted on an MO within an ON duration. In the elated art, the UE does not support the detecting of the DCI format 2_6 within the ON duration, so once the DCI scrambled with the PS-RNTI is detected on a search space allocated for the DCI format 2_6 within the ON duration, the DCI is immediately determined as the non-scheduled DCI. In addition, although the DCI format 2_6 is detected beyond the ON duration, at least one search space ID is consumed. However, in the scheme in this embodiment, the search space ID is used within the ON duration without any additional configuration overhead. The PS-RNTI is merely for illustrative purposes, and the base station may allocate a designated RNTI related to the sleep behavior indication for the UE, e.g., a dormancy-RNTI, so that the UE identified the non-scheduled DCI for indicating the PCell sleep indicator. A time when the DCI is effective is within the ON duration, so the DCI is also related to a Cell-Radio Network Temporary Identifier (C-RNTI) or a Modulation and Coding Scheme-Cell-Radio Network Temporary Identifier (MCS-C-RNTI). For example, the C-RNTI or the MCS-C-RNTI may be scaled at a constant ratio, or added with an offset value.

Sixth Embodiment

An effective time of the change of the PCell sleep behavior is after a time when the UE performs the HARQ-ACK feedback for the PCell sleep indicator. The change of the sleep behavior refers to the switching from a PCell non-sleep state to a sleep state, or the switching of the PCell sleep state to the non-sleep state. When the DCI is used to schedule data as mentioned in the second embodiment, the HARQ-ACK corresponds to data scheduled by the DCI for indicating the change of the PCell sleep behavior. When the non-scheduled DCI is used to indicate the PCell sleep behavior as mentioned in the third, fourth and fifth embodiments, the HARQ-ACK corresponds to whether the DCI has been received correctly. For the change of the sleep behavior may be effective after a predetermined time period (e.g., 2 ms) when the UE has returned the corresponding HARQ-ACK, or the predetermined time period is not set and the UE may perform the PCell sleep behavior immediately after the feedback of the HARQ-ACK.

Figure 9:
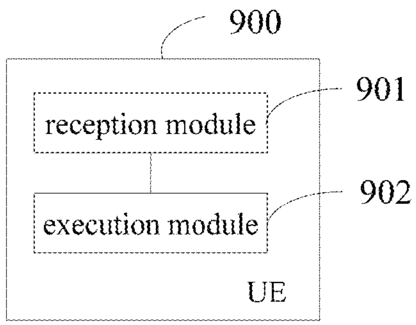
FIG. 9 is a block diagram of a UE according to one embodiment of the present disclosure.

As shown in FIG. 9, the present disclosure provides in some embodiments a UE 900, which includes: a reception module 901 configured to receive first information, the first information being used to indicate to perform a PCell sleep behavior; and an execution module 902 configured to perform the PCell sleep behavior for a PCell in accordance with the first information.

In some possible embodiments of the present disclosure, the PCell sleep behavior includes one of stopping monitoring a control channel within an ON duration, suspending from monitoring the control channel within the ON duration, performing sparse control channel monitoring within the ON duration, or monitoring the control channel on a part of search space subsets of a search space set.

In some possible embodiments of the present disclosure, the first information is used to indicate to perform the PCell sleep behavior through first indication resources; or the first information is used to indicate to perform the PCell sleep behavior through the first indication resources and indicate to perform an SCell sleep behavior through second indication resources.

In some possible embodiments of the present disclosure, the first indication further includes third indication resources, and the third indication resources are used to indicate a sleep indication type carried in the first information.

In some possible embodiments of the present disclosure, in the case that the third indication resources indicate a first value, the first information is used to indicate to perform the PCell sleep behavior through the first indication resources, and in the case that the third indication resources indicate a second value, the first information is used to indicate to perform the PCell sleep behavior through the first indication resources and indicate to perform the SCell sleep behavior through the second indication resources.

In some possible embodiments of the present disclosure, in the case that the third indication resources indicate the first value, the first indication resources overlap with target indication resources, and in the case that the first information is used to indicate to perform the SCell sleep behavior, the target indication resources are indication resources for indicating to perform the SCell sleep behavior.

In some possible embodiments of the present disclosure, in the case that the third indication resources indicate the first value, the SCell sleep behavior is indicated through second information.

In some possible embodiments of the present disclosure, in the case that the UE has received third information indicating that the third indication resources indicate a third value, the third information is used to indicate to perform the SCell sleep behavior.

In some possible embodiments of the present disclosure, the first information further includes fourth indication resources. In the case that the fourth indication resources indicate a fourth value, the first information is used to indicate to perform the PCell sleep behavior through the first indication resources, or the first information is used to indicate to perform the PCell sleep behavior through the first indication resources and perform the SCell sleep behavior through the second indication resources.

In some possible embodiments of the present disclosure, the fourth indication resources include an FDRA field in the first information.

In some possible embodiments of the present disclosure, the first indication resources are indication resources in the first information other than fifth indication resources, and the fifth indication resources are used to indicate at least one of an MCS, an NDI, an HARQ process number or an antenna port.

In some possible embodiments of the present disclosure, the second indication resources are used to indicate the SCell sleep behavior through an SCell group.

In some possible embodiments of the present disclosure, the first information is non-scheduled DCI or scheduled DCI.

In some possible embodiments of the present disclosure, the UE performs the PCell sleep behavior on a designated sleep BWP; or the UE performs the PCell sleep behavior on a currently-activated BWP.

In some possible embodiments of the present disclosure, the designated sleep BWP is configured with a sparse control channel monitoring period, a frequency of monitoring, by the UE, the control channel in the sparse control channel monitoring period is smaller than a predetermined value, and/or the sparse control channel monitoring period is selected from a predetermined period set.

In some possible embodiments of the present disclosure, in the case that the UE has been switched to the designated sleep BWP, a timer is maintained, and the UE does not monitor the control channel before the expiration of the timer.

In some possible embodiments of the present disclosure, in the case that the UE performs the PCell sleep behavior on the currently-activated BWP: the UE is switched from a first control channel monitoring period to a second control channel monitoring period on the currently-activated BWP, a frequency of monitoring, by the UE, and the control channel in the second control channel monitoring period is smaller than a frequency of monitoring, by the UE, the control channel in the first control channel monitoring period; and/or the UE performs skipping of one or more monitoring occasions on the currently-activated BWP; and/or the UE monitors the control channel in a first search space group in a plurality of search space groups on the currently-activated BWP, a frequency of monitoring, by the UE, the control channel in the first search space group is smaller than a frequency of monitoring, by the UE, the control channel in a second search space group, and the second search space group is a search space group in the plurality of search space groups different from the first search space group.

In some possible embodiments of the present disclosure, the UE is switched from the first control channel monitoring period to the second control channel monitoring period in accordance with signaling from a network side.

In some possible embodiments of the present disclosure, the first information is scrambled with a predetermined sequence.

In some possible embodiments of the present disclosure, the predetermined sequence includes a PS-RNTI.

In some possible embodiments of the present disclosure, the UE performs the PCell sleep behavior for the PCell after transmitting an HARQ-ACK for the first information.

It should be appreciated that, the UE 900 in the embodiments of the present disclosure is a UE in the above-mentioned method embodiments, and the implementation of the UE 900 may refer to that of the method with a same technical effect.

Figure 10:
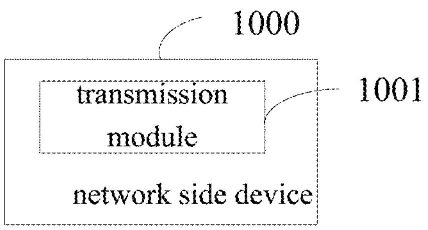
FIG. 10 is a block diagram of a network side device according to one embodiment of the present disclosure.

As shown in FIG. 10, the present disclosure provides in some embodiments a network side device 1000, which includes a transmission module 1001 configured to transmit first information, and the first information is used to indicate to perform a PCell sleep behavior.

In some possible embodiments of the present disclosure, the PCell sleep behavior includes one of stopping monitoring a control channel within an ON duration, suspending from monitoring the control channel within the ON duration, performing sparse control channel monitoring within the ON duration, or monitoring the control channel on a part of search space subsets of a search space set.

In some possible embodiments of the present disclosure, the first information is used to indicate to perform the PCell sleep behavior through first indication resources; or the first information is used to indicate to perform the PCell sleep behavior through the first indication resources and indicate to perform an SCell sleep behavior through second indication resources.

In some possible embodiments of the present disclosure, the first indication further includes third indication resources, and the third indication resources are used to indicate a sleep indication type carried in the first information.

In some possible embodiments of the present disclosure, in the case that the third indication resources indicate a first value, the first information is used to indicate to perform the PCell sleep behavior through the first indication resources, and in the case that the third indication resources indicate a second value, the first information is used to indicate to perform the PCell sleep behavior through the first indication resources and indicate to perform the SCell sleep behavior through the second indication resources.

In some possible embodiments of the present disclosure, in the case that the third indication resources indicate the first value, the first indication resources overlap with target indication resources, and in the case that the first information is used to indicate to perform the SCell sleep behavior, the target indication resources are indication resources for indicating to perform the SCell sleep behavior.

In some possible embodiments of the present disclosure, in the case that the third indication resources indicate the first value, the SCell sleep behavior is indicated through second information.

In some possible embodiments of the present disclosure, in the case that the network side device has transmitted third information indicating that the third indication resources indicate a third value, the third information is used to indicate to perform the SCell sleep behavior.

In some possible embodiments of the present disclosure, the first information further includes fourth indication resources. In the case that the fourth indication resources indicate a fourth value, the first information is used to indicate to perform the PCell sleep behavior through the first indication resources, or the first information is used to indicate to perform the PCell sleep behavior through the first indication resources and perform the SCell sleep behavior through the second indication resources.

In some possible embodiments of the present disclosure, the fourth indication resources include an FDRA field in the first information.

In some possible embodiments of the present disclosure, the first indication resources are indication resources in the first information other than fifth indication resources, and the fifth indication resources are used to indicate at least one of an MCS, an NDI, an HARQ process number or an antenna port.

In some possible embodiments of the present disclosure, the second indication resources are used to indicate the SCell sleep behavior through an SCell group.

In some possible embodiments of the present disclosure, the first information is non-scheduled DCI or scheduled DCI.

In some possible embodiments of the present disclosure, the PCell sleep behavior is a PCell sleep behavior performed on a designated sleep BWP; or the PCell sleep behavior is a PCell sleep behavior performed on a currently-activated BWP.

In some possible embodiments of the present disclosure, the designated sleep BWP is configured with a sparse control channel monitoring period, a frequency of monitoring, by a UE, the control channel in the sparse control channel monitoring period is smaller than a predetermined value, and/or the sparse control channel monitoring period is selected from a predetermined period set.

In some possible embodiments of the present disclosure, in the case that the PCell sleep behavior is a PCell sleep behavior performed on the designated sleep BWP, the PCell sleep behavior includes: switching the UE from a first control channel monitoring period to a second control channel monitoring period on the currently-activated BWP, a frequency of monitoring, by the UE, the control channel in the second control channel monitoring period being smaller than a frequency of monitoring, by the UE, the control channel in the first control channel monitoring period; and/or performing skipping of one or more monitoring occasions on the currently-activated BWP; and/or monitoring the control channel in a first search space group in a plurality of search space groups on the currently-activated BWP, a frequency of monitoring, by the UE, the control channel in the first search space group being smaller than a frequency of monitoring, by the UE, the control channel in a second search space group, and the second search space group being a search space group in the plurality of search space groups different from the first search space group.

In some possible embodiments of the present disclosure, the network side device indicates the UE to be switched from the first control channel monitoring period to the second control channel monitoring period in accordance with signaling from a network side.

In some possible embodiments of the present disclosure, the first information is scrambled with a predetermined sequence.

In some possible embodiments of the present disclosure, the predetermined sequence includes a PS-RNTI.

It should be appreciated that, the network side device 1000 is a network side device in the above-mentioned method embodiments, and the implementation of the method side device 1000 may refer to that of the method with a same technical effect, which will not be particularly defined herein.

Figure 11:
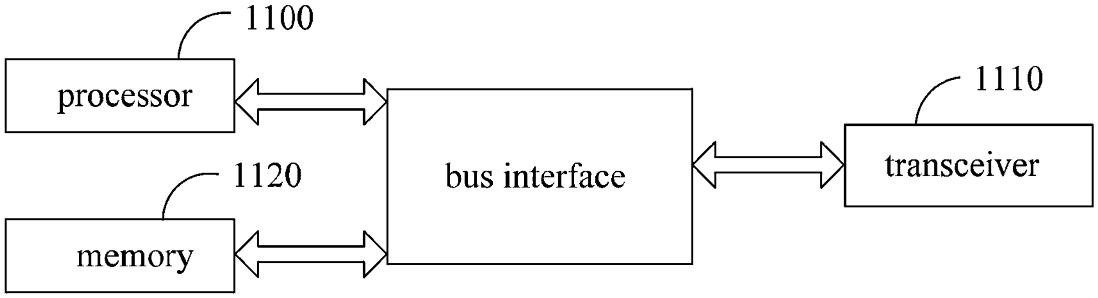
FIG. 11 is another block diagram of the UE according to one embodiment of the present disclosure.

As shown in FIG. 11, the present disclosure provides in some embodiments a UE, which includes a transceiver 1110, a memory 1120, a processor 1100, and a program instruction stored in the memory 1120 and executed by the processor 1100. The processor 1100 is configured to: receive first information, the first information being used to indicate to perform a PCell sleep behavior; and perform the PCell sleep behavior for a PCell in accordance with the first information. The transceiver is configured receive and transmit data under the control of the processor 1100.

In FIG. 11, bus architecture may include a number of buses and bridges connected to each other, so as to connect various circuits for one or more processors 1100 and one or more memories 1120. In addition, as is known in the art, the bus architecture may be used to connect any other circuits, such as a circuit for a peripheral device, a circuit for a voltage stabilizer and a power management circuit. A bus interface may be provided, and the transceiver 1110 may consist of a plurality of elements, i.e., a transmitter and a receiver for communication with any other devices over a transmission medium.

The processor 1100 may take charge of managing the bus architecture as well as general processings. The memory 1120 may store therein data for the operation of the processor 1100.

It should be appreciated that, the memory 1120 is not limited to be located on the UE, and the memory 1120 and the processor 1100 may also be arranged at different geographical positions.

In some possible embodiments of the present disclosure, the PCell sleep behavior includes one of stopping monitoring a control channel within an ON duration, suspending from monitoring the control channel within the ON duration, performing sparse control channel monitoring within the ON duration, or monitoring the control channel on a part of search space subsets of a search space set.

In some possible embodiments of the present disclosure, the first information is used to indicate to perform the PCell sleep behavior through first indication resources; or the first information is used to indicate to perform the PCell sleep behavior through the first indication resources and indicate to perform an SCell sleep behavior through second indication resources.

In some possible embodiments of the present disclosure, the first indication further includes third indication resources, and the third indication resources are used to indicate a sleep indication type carried in the first information.

In some possible embodiments of the present disclosure, in the case that the third indication resources indicate a first value, the first information is used to indicate to perform the PCell sleep behavior through the first indication resources, and in the case that the third indication resources indicate a second value, the first information is used to indicate to perform the PCell sleep behavior through the first indication resources and indicate to perform the SCell sleep behavior through the second indication resources.

In some possible embodiments of the present disclosure, in the case that the third indication resources indicate the first value, the first indication resources overlap with target indication resources, and in the case that the first information is used to indicate to perform the SCell sleep behavior, the target indication resources are indication resources for indicating to perform the SCell sleep behavior.

In some possible embodiments of the present disclosure, in the case that the third indication resources indicate the first value, the SCell sleep behavior is indicated through second information.

In some possible embodiments of the present disclosure, in the case that the UE has received third information indicating that the third indication resources indicate a third value, the third information is used to indicate to perform the SCell sleep behavior.

In some possible embodiments of the present disclosure, the first information further includes fourth indication resources. In the case that the fourth indication resources indicate a fourth value, the first information is used to indicate to perform the PCell sleep behavior through the first indication resources, or the first information is used to indicate to perform the PCell sleep behavior through the first indication resources and perform the SCell sleep behavior through the second indication resources.

In some possible embodiments of the present disclosure, the fourth indication resources include an FDRA field in the first information.

In some possible embodiments of the present disclosure, the first indication resources are indication resources in the first information other than fifth indication resources, and the fifth indication resources are used to indicate at least one of an MCS, an NDI, an HARQ process number or an antenna port.

In some possible embodiments of the present disclosure, the second indication resources are used to indicate the SCell sleep behavior through an SCell group.

In some possible embodiments of the present disclosure, the first information is non-scheduled DCI or scheduled DCI.

In some possible embodiments of the present disclosure, the UE performs the PCell sleep behavior on a designated sleep BWP; or the UE performs the PCell sleep behavior on a currently-activated BWP.

In some possible embodiments of the present disclosure, the designated sleep BWP is configured with a sparse control channel monitoring period, a frequency of monitoring, by the UE, the control channel in the sparse control channel monitoring period is smaller than a predetermined value, and/or the sparse control channel monitoring period is selected from a predetermined period set.

In some possible embodiments of the present disclosure, in the case that the UE has been switched to the designated sleep BWP, a timer is maintained, and the UE does not monitor the control channel before the expiration of the timer.

In some possible embodiments of the present disclosure, in the case that the UE performs the PCell sleep behavior on the currently-activated BWP: the UE is switched from a first control channel monitoring period to a second control channel monitoring period on the currently-activated BWP, a frequency of monitoring, by the UE, and the control channel in the second control channel monitoring period is smaller than a frequency of monitoring, by the UE, the control channel in the first control channel monitoring period; and/or the UE performs skipping of one or more monitoring occasions on the currently-activated BWP; and/or the UE monitors the control channel in a first search space group in a plurality of search space groups on the currently-activated BWP, a frequency of monitoring, by the UE, the control channel in the first search space group is smaller than a frequency of monitoring, by the UE, the control channel in a second search space group, and the second search space group is a search space group in the plurality of search space groups different from the first search space group.

In some possible embodiments of the present disclosure, the UE is switched from the first control channel monitoring period to the second control channel monitoring period in accordance with signaling from a network side.

In some possible embodiments of the present disclosure, the first information is scrambled with a predetermined sequence.

In some possible embodiments of the present disclosure, the predetermined sequence includes a PS-RNTI.

In some possible embodiments of the present disclosure, the UE performs the PCell sleep behavior for the PCell after transmitting an HARQ-ACK for the first information.

It should be appreciated that, the UE in the embodiments is a UE in the above-mentioned method embodiment, and the implementation of the UE may refer to that of the method with a same beneficial effect, which will not be particularly defined herein.

Figure 12:
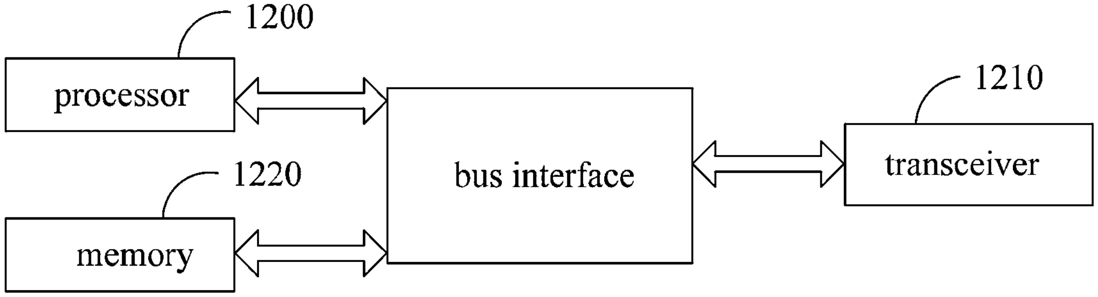
FIG. 12 is another block diagram of the network side device according to one embodiment of the present disclosure.

As shown in FIG. 12, the present disclosure further provides in some embodiments a network side device, which includes a transceiver 1210, a memory 1220, a processor 1200, and a program instruction stored in the memory 1220 and executed by the processor. The processor 1200 is configured to transmit first information, and the first information is used to indicate to perform a PCell sleep behavior. The transceiver 1210 is configured to receive and transmit data under the control of the processor 1200.

In FIG. 12, bus architecture may include a number of buses and bridges connected to each other, so as to connect various circuits for one or more processors 1200 and one or more memories 1220. In addition, as is known in the art, the bus architecture may be used to connect any other circuits, such as a circuit for a peripheral device, a circuit for a voltage stabilizer and a power management circuit. A bus interface may be provided, and the transceiver 1210 may consist of a plurality of elements, i.e., a transmitter and a receiver for communication with any other devices over a transmission medium.

The processor 1200 may take charge of managing the bus architecture as well as general processings. The memory 1220 may store therein data for the operation of the processor 1200.

It should be appreciated that, the memory 1220 is not limited to be located on the network side device, and the memory 1220 and the processor 1200 may also be arranged at different geographical positions.

In some possible embodiments of the present disclosure, the PCell sleep behavior includes one of stopping monitoring a control channel within an ON duration, suspending from monitoring the control channel within the ON duration, performing sparse control channel monitoring within the ON duration, or monitoring the control channel on a part of search space subsets of a search space set.

In some possible embodiments of the present disclosure, the first information is used to indicate to perform the PCell sleep behavior through first indication resources; or the first information is used to indicate to perform the PCell sleep behavior through the first indication resources and indicate to perform an SCell sleep behavior through second indication resources.

In some possible embodiments of the present disclosure, the first indication further includes third indication resources, and the third indication resources are used to indicate a sleep indication type carried in the first information.

In some possible embodiments of the present disclosure, in the case that the third indication resources indicate a first value, the first information is used to indicate to perform the PCell sleep behavior through the first indication resources, and in the case that the third indication resources indicate a second value, the first information is used to indicate to perform the PCell sleep behavior through the first indication resources and indicate to perform the SCell sleep behavior through the second indication resources.

In some possible embodiments of the present disclosure, in the case that the third indication resources indicate the first value, the first indication resources overlap with target indication resources, and in the case that the first information is used to indicate to perform the SCell sleep behavior, the target indication resources are indication resources for indicating to perform the SCell sleep behavior.

In some possible embodiments of the present disclosure, in the case that the third indication resources indicate the first value, the SCell sleep behavior is indicated through second information.

In some possible embodiments of the present disclosure, in the case that the network side device has transmitted third information indicating that the third indication resources indicate a third value, the third information is used to indicate to perform the SCell sleep behavior.

In some possible embodiments of the present disclosure, the first information further includes fourth indication resources. In the case that the fourth indication resources indicate a fourth value, the first information is used to indicate to perform the PCell sleep behavior through the first indication resources, or the first information is used to indicate to perform the PCell sleep behavior through the first indication resources and perform the SCell sleep behavior through the second indication resources.

In some possible embodiments of the present disclosure, the fourth indication resources include an FDRA field in the first information.

In some possible embodiments of the present disclosure, the first indication resources are indication resources in the first information other than fifth indication resources, and the fifth indication resources are used to indicate at least one of an MCS, an NDI, an HARQ process number or an antenna port.

In some possible embodiments of the present disclosure, the second indication resources are used to indicate the SCell sleep behavior through an SCell group.

In some possible embodiments of the present disclosure, the first information is non-scheduled DCI or scheduled DCI.

In some possible embodiments of the present disclosure, the PCell sleep behavior is a PCell sleep behavior performed on a designated sleep BWP; or the PCell sleep behavior is a PCell sleep behavior performed on a currently-activated BWP.

In some possible embodiments of the present disclosure, the designated sleep BWP is configured with a sparse control channel monitoring period, a frequency of monitoring, by a UE, the control channel in the sparse control channel monitoring period is smaller than a predetermined value, and/or the sparse control channel monitoring period is selected from a predetermined period set.

In some possible embodiments of the present disclosure, in the case that the PCell sleep behavior is a PCell sleep behavior performed on the designated sleep BWP, the PCell sleep behavior includes: switching the UE from a first control channel monitoring period to a second control channel monitoring period on the currently-activated BWP, a frequency of monitoring, by the UE, the control channel in the second control channel monitoring period being smaller than a frequency of monitoring, by the UE, the control channel in the first control channel monitoring period; and/or performing skipping of one or more monitoring occasions on the currently-activated BWP; and/or monitoring the control channel in a first search space group in a plurality of search space groups on the currently-activated BWP, a frequency of monitoring, by the UE, the control channel in the first search space group being smaller than a frequency of monitoring, by the UE, the control channel in a second search space group, and the second search space group being a search space group in the plurality of search space groups different from the first search space group.

In some possible embodiments of the present disclosure, the network side device indicates the UE to be switched from the first control channel monitoring period to the second control channel monitoring period in accordance with signaling from a network side.

In some possible embodiments of the present disclosure, the first information is scrambled with a predetermined sequence.

In some possible embodiments of the present disclosure, the predetermined sequence includes a PS-RNTI.

It should be appreciated that, the network side device in the embodiments of the present disclosure is a network side device in the above-mentioned method embodiments, and the implementation of the network side device may refer to that of the method with a same beneficial effect, which will not be particularly defined herein.

The present disclosure further provides in some embodiments a computer readable storage medium storing therein a program instruction. The program instruction is executed by a processor, so as to implement steps of the sleep indication method for the UE or the steps of the sleep indication method for the network side device.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be appreciated that, all or parts of the steps in the method may be implemented by related hardware under the control of a computer program. The computer program may be stored in a computer-readable storage medium, and it may be executed so as to implement the steps in the above-mentioned method embodiments. The storage medium may be a magnetic disk, an optical disk, an ROM or an RAM.

It should be appreciated that, the embodiments of the present disclosure may be implemented by hardware, software, firmware, middleware, microcode or a combination thereof. For the hardware implementation, the processor may include one or more of an Application Specific Integrated Circuit (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A sleep indication method, comprising:

receiving, by a User Equipment (UE), first information, the first information being used to indicate to perform a Primary Cell (PCell) sleep behavior; and performing, by the UE, the PCell sleep behavior for a PCell in accordance with the first information, wherein the PCell sleep behavior comprises one of stopping monitoring a control channel within an ON duration, suspending from monitoring the control channel within the ON duration, performing sparse control channel monitoring within the ON duration, or monitoring the control channel on a part of search space subsets of a search space set, wherein the UE performs the PCell sleep behavior on a currently-activated BandWidth Part (BWP), wherein in the case that the UE performs the PCell sleep behavior on the currently-activated BWP, the UE is switched from a first control channel monitoring period to a second control channel monitoring period on the currently-activated BWP, a frequency of monitoring, by the UE, and the control channel in the second control channel monitoring period is smaller than a frequency of monitoring, by the UE, the control channel in the first control channel monitoring period, wherein the UE is switched from the first control channel monitoring period to the second control channel monitoring period in accordance with signaling from a network side; or, wherein in the case that the UE performs the PCell sleep behavior on the currently-activated BWP, the UE performs skipping of one or more monitoring occasions on the currently-activated BWP; or, wherein in the case that the UE performs the PCell sleep behavior on the currently-activated BWP, the UE monitors the control channel in a first search space group in a plurality of search space groups on the currently-activated BWP, a frequency of monitoring, by the UE, the control channel in the first search space group is smaller than a frequency of monitoring, by the UE, the control channel in a second search space group, and the second search space group is a search space group in the plurality of search space groups different from the first search space group, wherein the first information is used to indicate to perform the PCell sleep behavior through first indication resources;

wherein the first indication resources are indication resources in the first information other than fifth indication resources, and the fifth indication resources are used to indicate at least one of a Modulation and Coding Scheme (MCS), a New Data Indicator (NDI), a Hybrid Automatic Repeat reQuest (HARQ) process number or an antenna port.

2. The sleep indication method according to claim 1, wherein the first information is used to indicate to perform the PCell sleep behavior through the first indication resources and indicate to perform a Secondary Cell (SCell) sleep behavior through second indication resources.

3. The sleep indication method according to claim 2, wherein the first information further comprises third indication resources, and the third indication resources are used to indicate a sleep indication type carried in the first information.

4. The sleep indication method according to claim 3, wherein in the case that the third indication resources indicate a first value, the first information is used to indicate to perform the PCell sleep behavior through the first indication resources;

in the case that the third indication resources indicate a second value, the first information is used to indicate to perform the PCell sleep behavior through the first indication resources and indicate to perform the SCell sleep behavior through the second indication resources; or in the case that the third indication resources indicate the first value, the first indication resources overlap with target indication resources; or in the case that the third indication resources indicate the first value, the SCell sleep behavior is indicated through second information; or in the case that the first information is used to indicate to perform the SCell sleep behavior, the target indication resources are indication resources for indicating to perform the SCell sleep behavior.

5. The sleep indication method according to claim 4, wherein in the case that the UE has received third information indicating that the third indication resources indicate a third value, the third information is used to indicate to perform the SCell sleep behavior.

6. The sleep indication method according to claim 2, wherein the first information further comprises fourth indication resources, wherein in the case that the fourth indication resources indicate a fourth value, the first information is used to indicate to perform the PCell sleep behavior through the first indication resources, or the first information is used to indicate to perform the PCell sleep behavior through the first indication resources and perform the SCell sleep behavior through the second indication resources.

7. The sleep indication method according to claim 2, wherein the second indication resources are used to indicate the SCell sleep behavior through an SCell group; or wherein the first information is non-scheduled DCI or scheduled DCI.

8. The sleep indication method according to claim 1, wherein the UE performs the PCell sleep behavior for the PCell after transmitting a Hybrid Automatic Repeat reQuest Acknowledgement (HARQ-ACK) for the first information.

9. A sleep indication method, comprising: transmitting, by a network side device, first information, the first information being used to indicate a User Equipment (UE) to perform a PCell sleep behavior, wherein the PCell sleep behavior comprises one of stopping monitoring a control channel within an ON duration, suspending from monitoring the control channel within the ON duration, performing sparse control channel monitoring within the ON duration, or monitoring the control channel on a part of search space subsets of a search space set, wherein the first information is used to indicate the UE to perform the PCell sleep behavior on a currently-activated BandWidth Part (BWP), wherein in the case that the UE performs the PCell sleep behavior on the currently-activated BWP, the UE is switched from a first control channel monitoring period to a second control channel monitoring period on the currently-activated BWP, a frequency of monitoring, by the UE, and the control channel in the second control channel monitoring period is smaller than a frequency of monitoring, by the UE, the control channel in the first control channel monitoring period, wherein the UE is switched from the first control channel monitoring period to the second control channel monitoring period in accordance with signaling from the network side; or, wherein in the case that the UE performs the PCell sleep behavior on the currently-activated BWP, the UE performs skipping of one or more monitoring occasions on the currently-activated BWP; or, wherein in the case that the UE performs the PCell sleep behavior on the currently-activated BWP, the UE monitors the control channel in a first search space group in a plurality of search space groups on the currently-activated BWP, a frequency of monitoring, by the UE, the control channel in the first search space group is smaller than a frequency of monitoring, by the UE, the control channel in a second search space group, and the second search space group is a search space group in the plurality of search space groups different from the first search space group, wherein the first information is used to indicate to perform the PCell sleep behavior through first indication resources;

wherein the first indication resources are indication resources in the first information other than fifth indication resources, and the fifth indication resources are used to indicate at least one of a Modulation and Coding Scheme (MCS), a New Data Indicator (NDI), a Hybrid Automatic Repeat reQuest (HARQ) process number or an antenna port.

10. The sleep indication method according to claim 9, wherein the first information is used to indicate to perform the PCell sleep behavior through the first indication resources and indicate to perform an SCell sleep behavior through second indication resources, wherein the first information further comprises third indication resources, and the third indication resources are used to indicate a sleep indication type carried in the first information.

11. The sleep indication method according to claim 10, wherein in the case that the third indication resources indicate a first value, the first information is used to indicate to perform the PCell sleep behavior through the first indication resources;

in the case that the third indication resources indicate a second value, the first information is used to indicate to perform the PCell sleep behavior through the first indication resources and indicate to perform the SCell sleep behavior through the second indication resources; or in the case that the third indication resources indicate the first value, the first indication resources overlap with target indication resources; or in the case that the first information is used to indicate to perform the SCell sleep behavior, the target indication resources are indication resources for indicating to perform the SCell sleep behavior; or in the case that the third indication resources indicate the first value, the SCell sleep behavior is indicated through second information; or in the case that the network side device has transmitted third information indicating that the third indication resources indicate a third value, the third information is used to indicate to perform the SCell sleep behavior.

12. The sleep indication method according to claim 10, wherein the first information further comprises fourth indication resources, wherein in the case that the fourth indication resources indicate a fourth value, the first information is used to indicate to perform the PCell sleep behavior through the first indication resources, or the first information is used to indicate to perform the PCell sleep behavior through the first indication resources and perform the SCell sleep behavior through the second indication resources.

13. The sleep indication method according to claim 10, wherein the second indication resources are used to indicate the SCell sleep behavior through an SCell group; or wherein the first information is non-scheduled DCI or scheduled DCI.

14. A network side device, comprising: a transceiver, a memory, a processor, and a program instruction stored in the memory and executed by the processor, wherein the processor is configured to call and execute the program stored in the memory so as to realize the sleep indication method according to claim 9.

15. A User Equipment (UE), comprising: a transceiver, a memory, a processor, and a program instruction stored in the memory and executed by the processor, wherein the processor is configured to: receive first information, the first information being used to indicate to perform a PCell sleep behavior; and perform the PCell sleep behavior for a PCell in accordance with the first information, wherein the PCell sleep behavior comprises one of stopping monitoring a control channel within an ON duration, suspending from monitoring the control channel within the ON duration, performing sparse control channel monitoring within the ON duration, or monitoring the control channel on a part of search space subsets of a search space set, wherein the UE performs the PCell sleep behavior on a currently-activated BandWidth Part (BWP), wherein in the case that the UE performs the PCell sleep behavior on the currently-activated BWP, the UE is switched from a first control channel monitoring period to a second control channel monitoring period on the currently-activated BWP, a frequency of monitoring, by the UE, and the control channel in the second control channel monitoring period is smaller than a frequency of monitoring, by the UE, the control channel in the first control channel monitoring period, wherein the UE is switched from the first control channel monitoring period to the second control channel monitoring period in accordance with signaling from a network side; or, wherein in the case that the UE performs the PCell sleep behavior on the currently-activated BWP, the UE performs skipping of one or more monitoring occasions on the currently-activated BWP; or, wherein in the case that the UE performs the PCell sleep behavior on the currently-activated BWP, the UE monitors the control channel in a first search space group in a plurality of search space groups on the currently-activated BWP, a frequency of monitoring, by the UE, the control channel in the first search space group is smaller than a frequency of monitoring, by the UE, the control channel in a second search space group, and the second search space group is a search space group in the plurality of search space groups different from the first search space group, wherein the first information is used to indicate to perform the PCell sleep behavior through first indication resources;

wherein the first indication resources are indication resources in the first information other than fifth indication resources, and the fifth indication resources are used to indicate at least one of a Modulation and Coding Scheme (MCS), a New Data Indicator (NDI), a Hybrid Automatic Repeat reQuest (HARQ) process number or an antenna port.

* * * * *